(12) United States Patent
Hawthorn et al.

(10) Patent No.: US 6,499,765 B2
(45) Date of Patent: Dec. 31, 2002

(54) BIAS DEPLOYMENT INFLATABLE AIR BAG

(75) Inventors: Laura Adelle Hawthorn, Tipp City, OH (US); Jingoo Kim, Dayton, OH (US); Ryan Todd Pinsenschaum, Vandalia, OH (US); Stephanie L Dunkle, Springboro, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/861,465

(22) Filed: May 18, 2001

(65) Prior Publication Data

US 2002/0070541 A1 Jun. 13, 2002

Related U.S. Application Data

(60) Provisional application No. 60/244,634, filed on Oct. 31, 2000.

(51) Int. Cl.$^7$ .............................................. B60R 21/16
(52) U.S. Cl. .................................... 280/743.1; 280/732
(58) Field of Search .............................. 280/730.1, 732, 280/728.1, 743.1

(56) References Cited

U.S. PATENT DOCUMENTS

| | | | | |
|---|---|---|---|---|
| 4,235,453 A | * | 11/1980 | Lawson et al. .......... | 280/743.1 |
| 5,240,282 A | * | 8/1993 | Wehner et al. .......... | 280/728.1 |
| 5,246,250 A | * | 9/1993 | Wolanin et al. ............. | 251/294 |
| 5,324,070 A | * | 6/1994 | Kitagawa et al. ........ | 280/730.1 |
| 5,348,343 A | | 9/1994 | Hawthorn ............... | 280/730 R |
| 5,380,038 A | | 1/1995 | Hawthorn et al. ...... | 280/730 R |
| 5,382,048 A | * | 1/1995 | Paxton et al. ............ | 280/728.1 |
| 5,425,551 A | | 6/1995 | Hawthorn ................ | 280/743.1 |
| 5,496,056 A | * | 3/1996 | Dyer ........................ | 280/728.1 |
| 5,531,477 A | * | 7/1996 | Madrigal et al. ........ | 280/743.1 |
| 5,538,281 A | * | 7/1996 | Patercsak ................. | 280/743.1 |
| 5,564,730 A | * | 10/1996 | Chizenko et al. ........ | 280/728.1 |
| 5,575,497 A | * | 11/1996 | Suyama et al. .......... | 280/730.1 |
| 5,803,483 A | * | 9/1998 | Lunt ........................ | 280/728.1 |
| 6,196,585 B1 | * | 3/2001 | Igawa ...................... | 280/728.1 |
| 6,250,675 B1 | * | 6/2001 | Dietsch et al. ........... | 280/743.1 |
| 6,286,866 B1 | * | 9/2001 | Satge et al. .............. | 280/743.1 |
| 6,382,664 B1 | * | 5/2002 | Hirano et al. ............ | 280/730.2 |
| 6,422,602 B1 | * | 7/2002 | Ishii et al. ............... | 280/728.2 |

FOREIGN PATENT DOCUMENTS

JP           341602     * 12/2001

* cited by examiner

*Primary Examiner*—Paul N. Dickson
*Assistant Examiner*—Toan To
(74) *Attorney, Agent, or Firm*—Kathryn A. Marra

(57) ABSTRACT

An air bag cushion folded for storage within a vehicle to achieve a predefined folded surface geometry corresponding to a desired storage location for the folded air bag cushion. A portion of the air bag cushion extending along a first lateral boundary edge for deployment inboard of the passenger seating location is folded in a construction inwardly to establish a first lateral edge of the predefined folded surface geometry. A portion of the air bag cushion disposed along the opposing lateral boundary edge is folded inwardly along a second internal lateral boundary line corresponding to a second lateral edge of the predefined folded surface geometry. The top and bottom edges are folded inwardly to finalize the desired geometry. The folding arrangement is such that upon encountering an obstacle during the initial stage of deployment the air bag is deployed in a lateral direction to the side of and around the occupant to be protected.

22 Claims, 11 Drawing Sheets

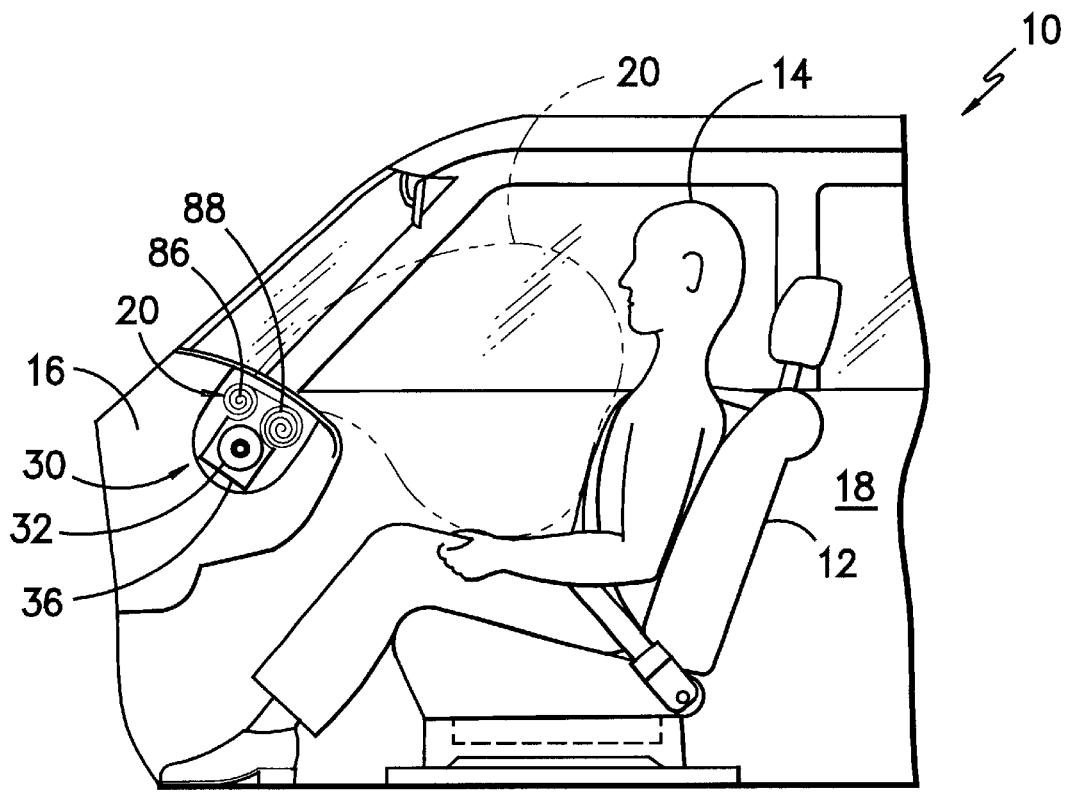
FIG. -1-
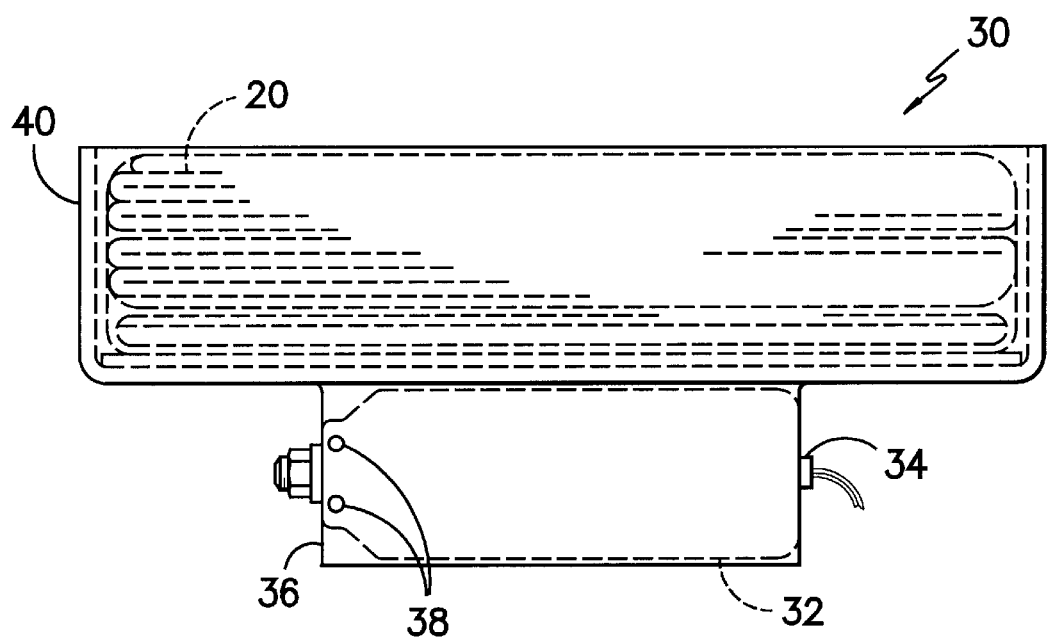
FIG. -2-

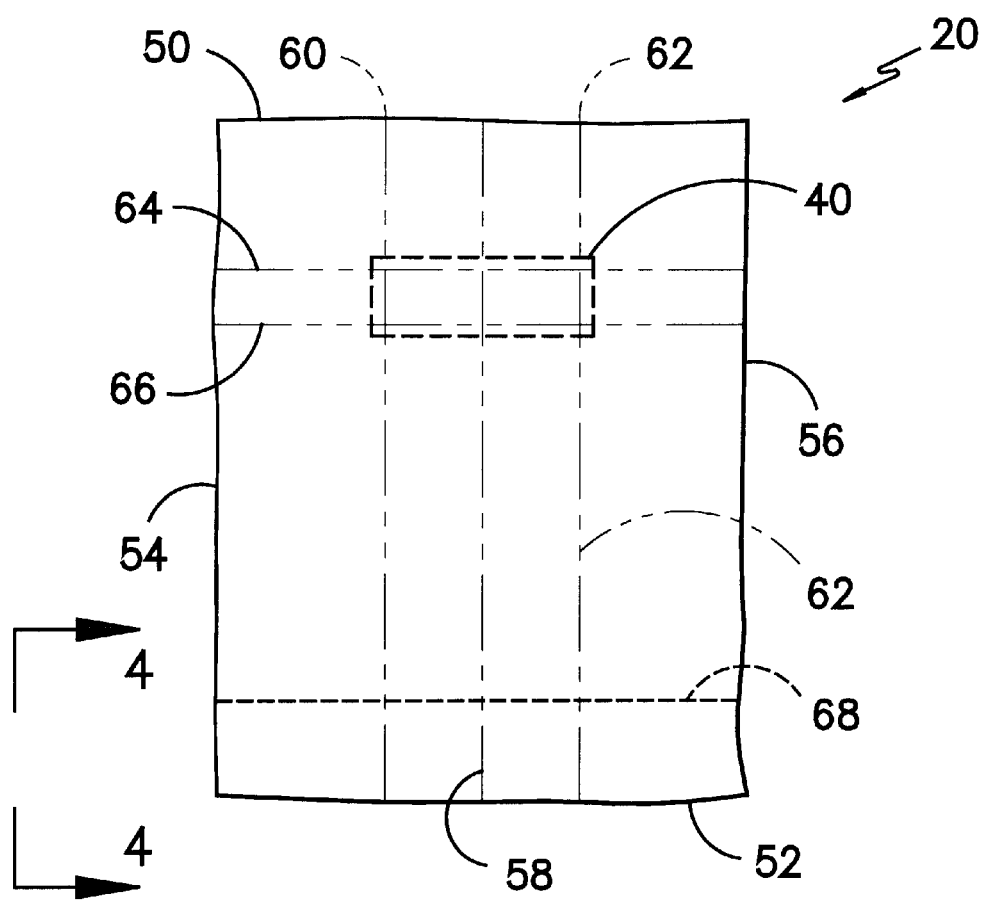
FIG. -3-
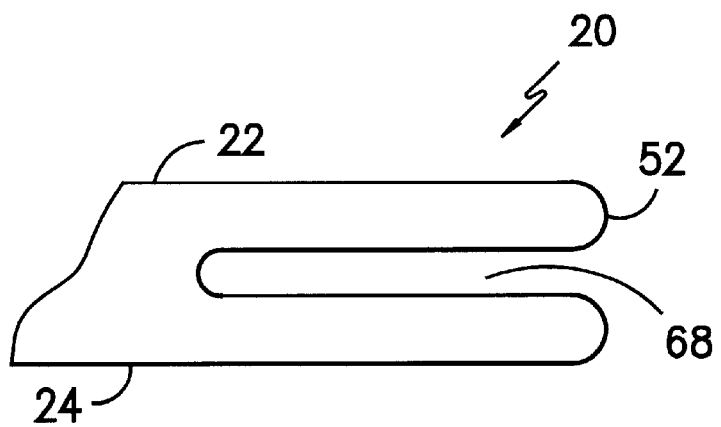
FIG. -4-

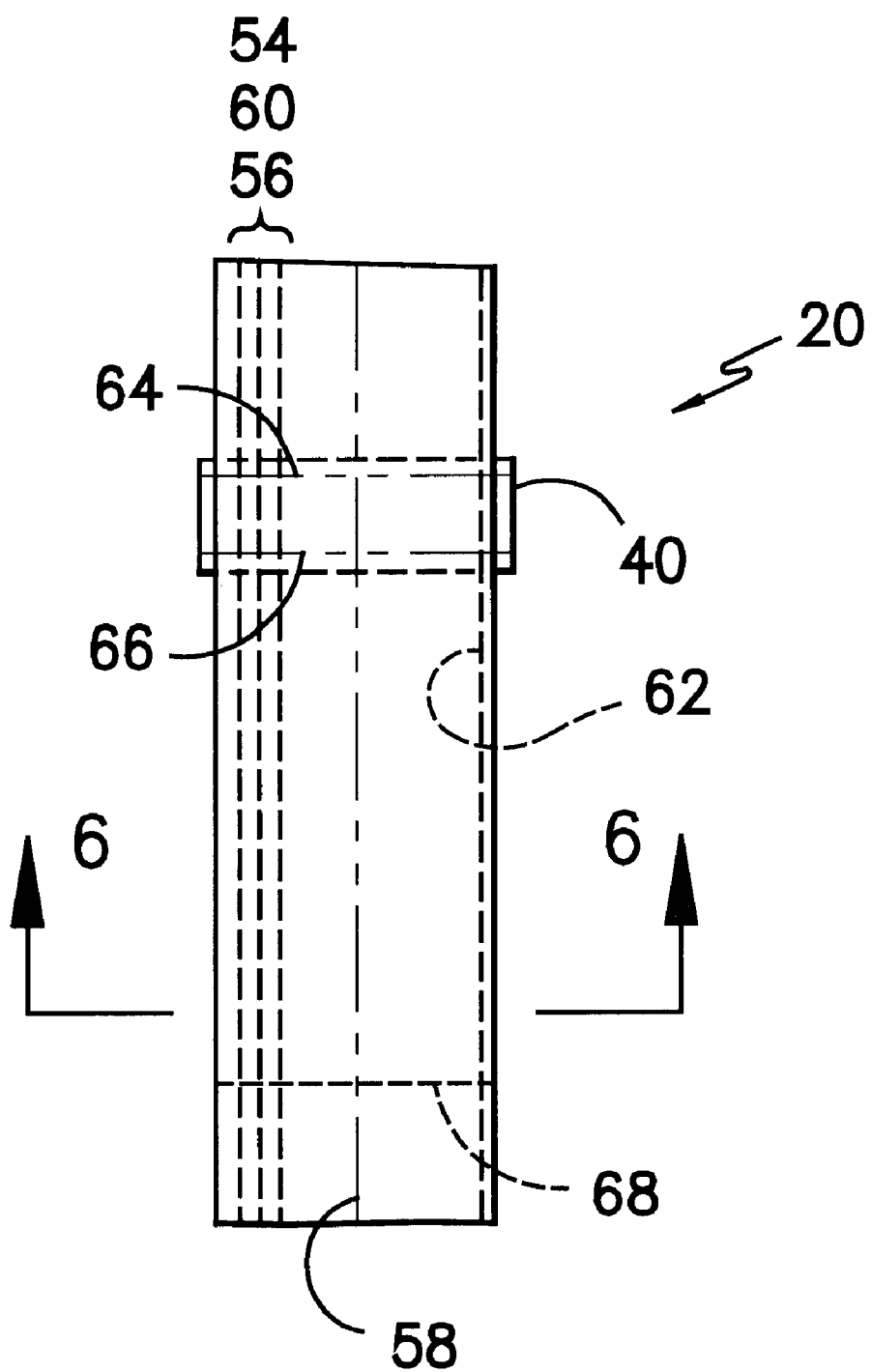
FIG. -5-

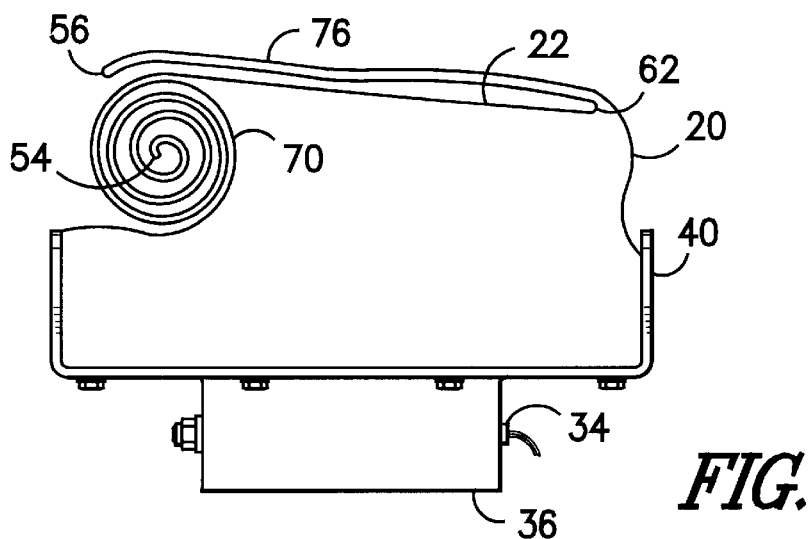
FIG. -6-
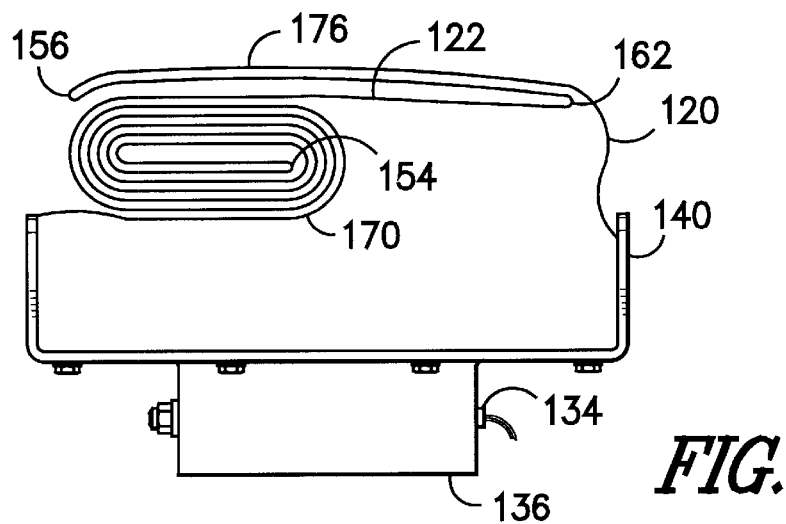
FIG. -6A-
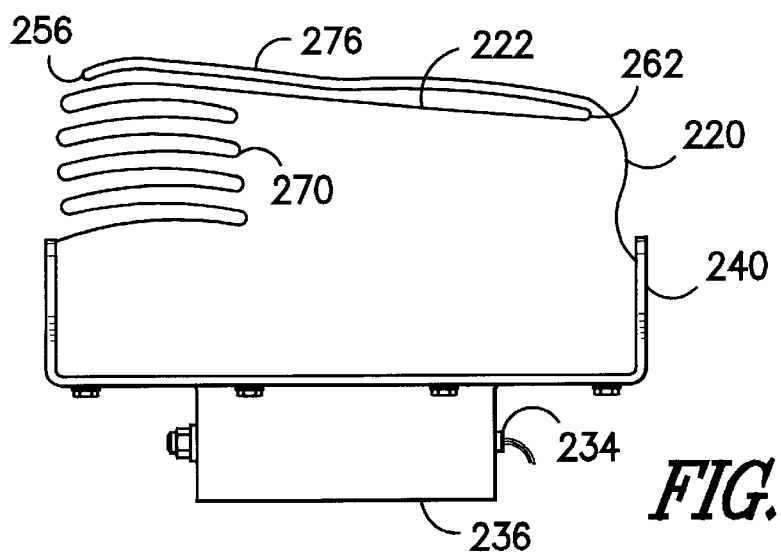
FIG. -6B-

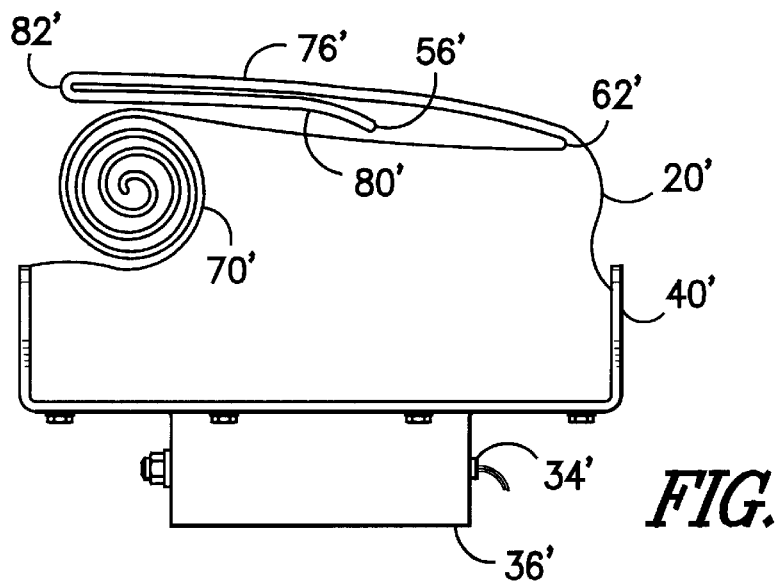
FIG. -7-
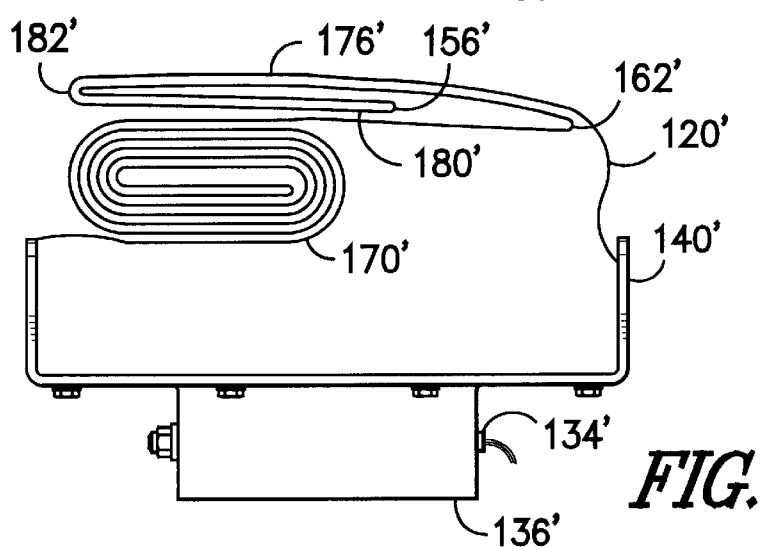
FIG. -7A-
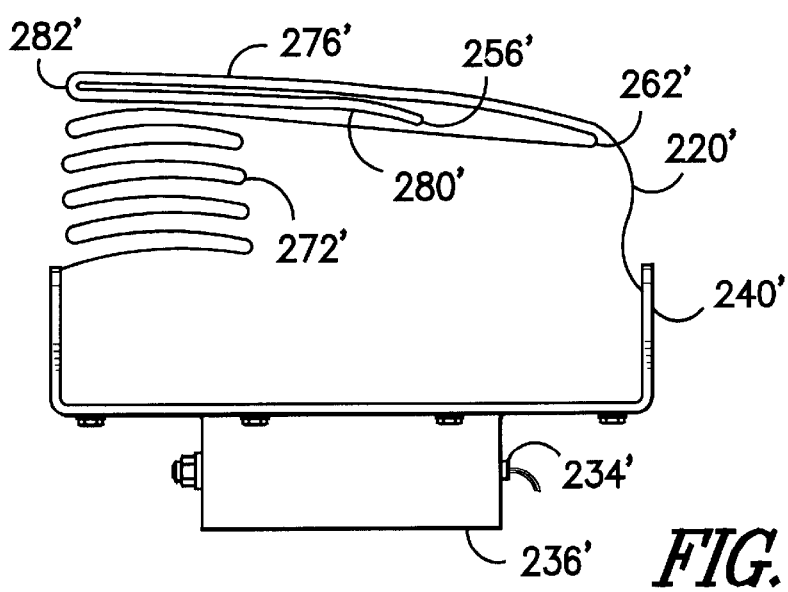
FIG. -7B-

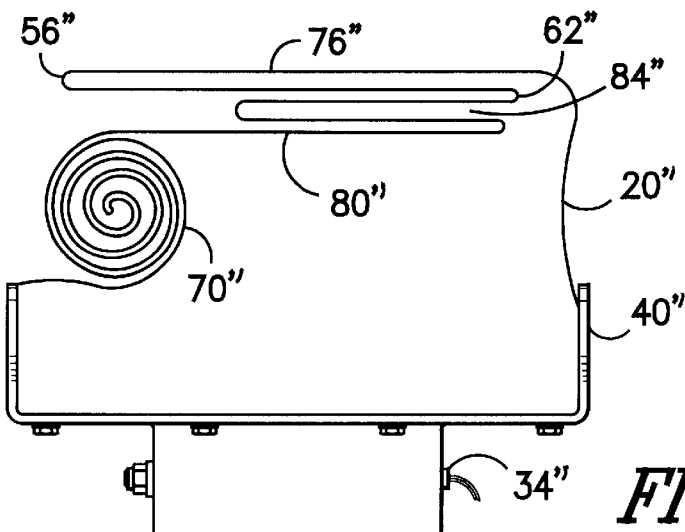
FIG. -8-
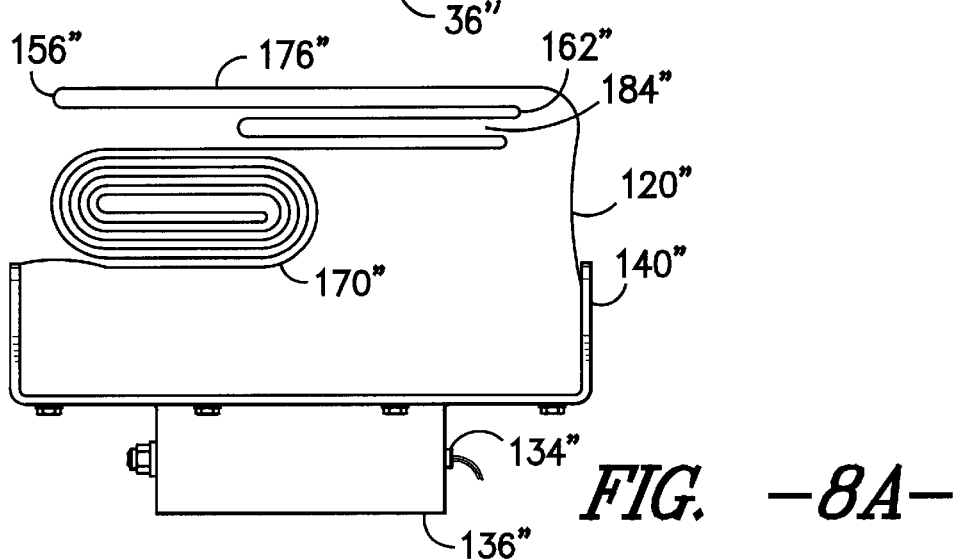
FIG. -8A-
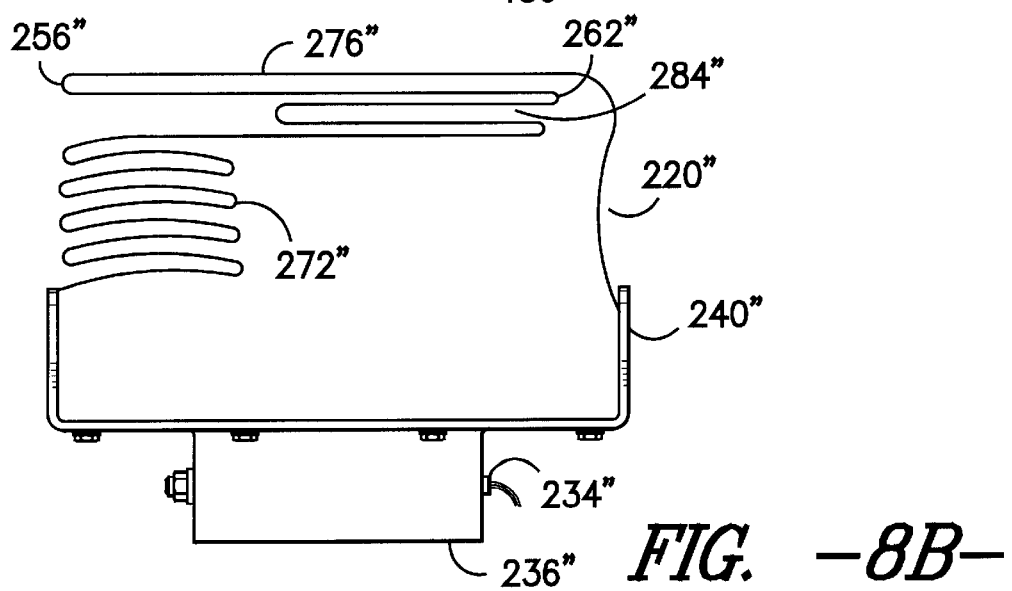
FIG. -8B-

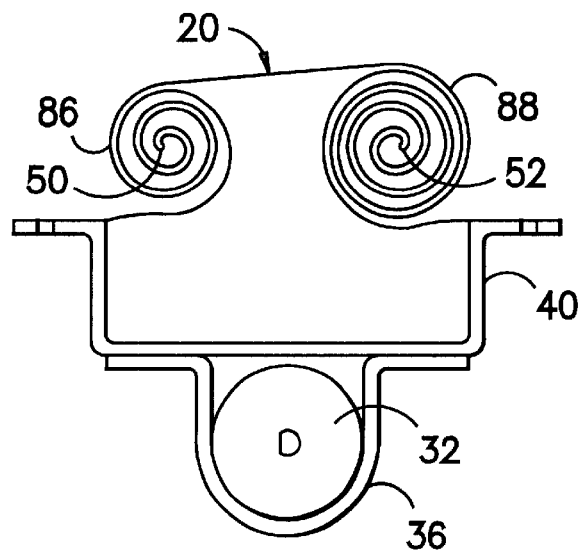
FIG. -9-
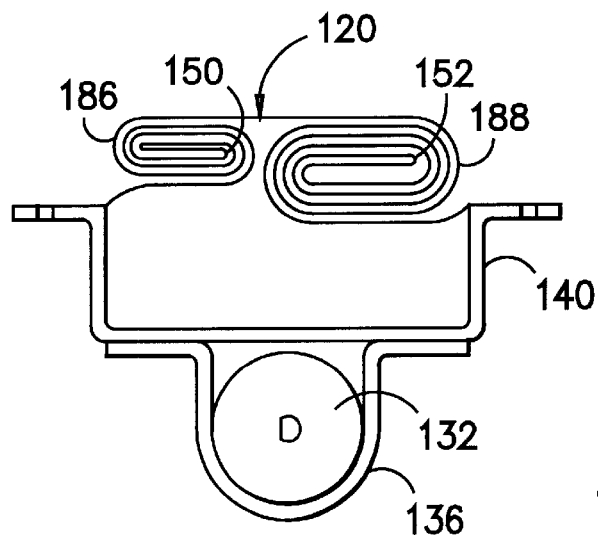
FIG. -9A-
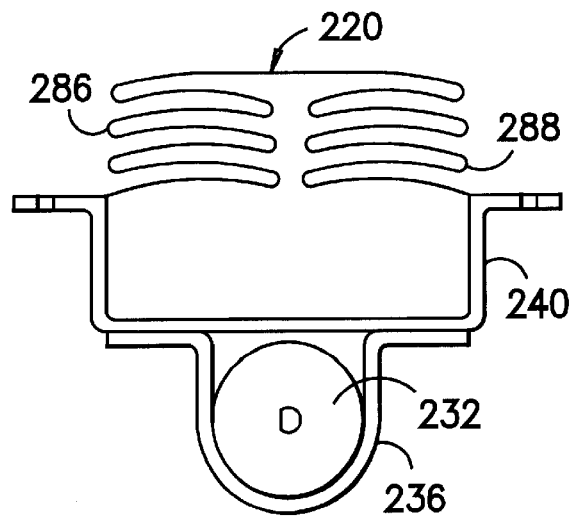
FIG. -9B-

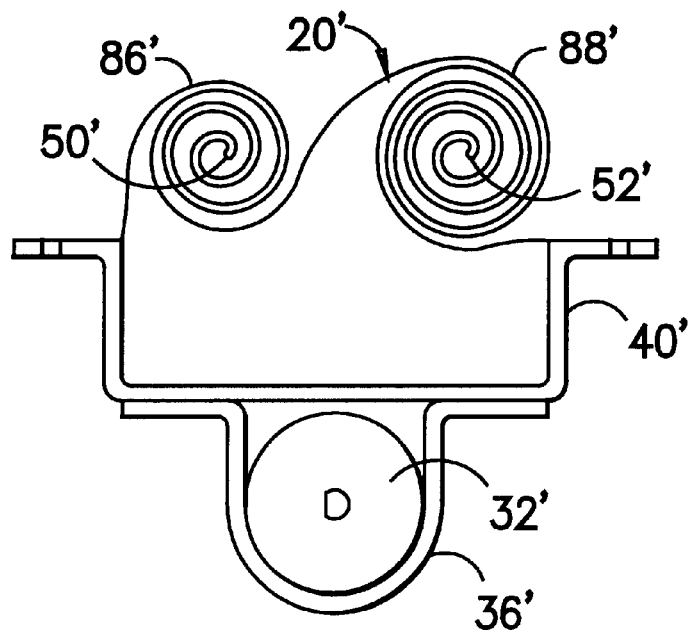
FIG. —10—
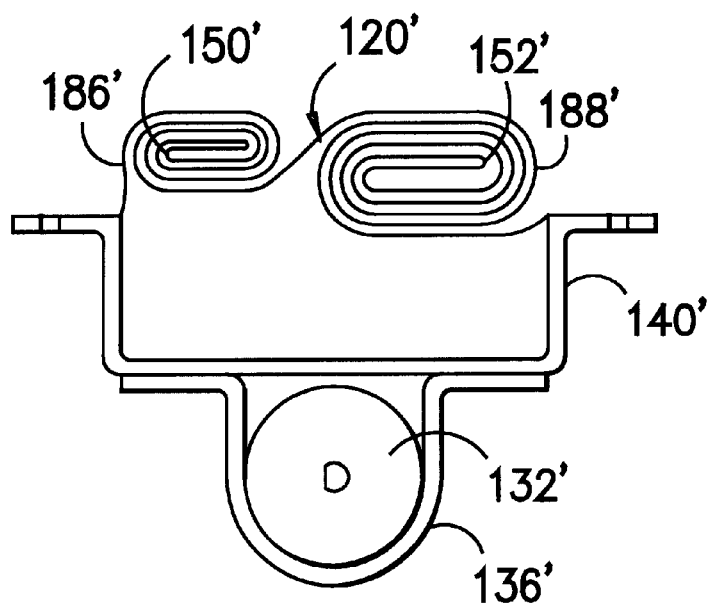
FIG. —10A—

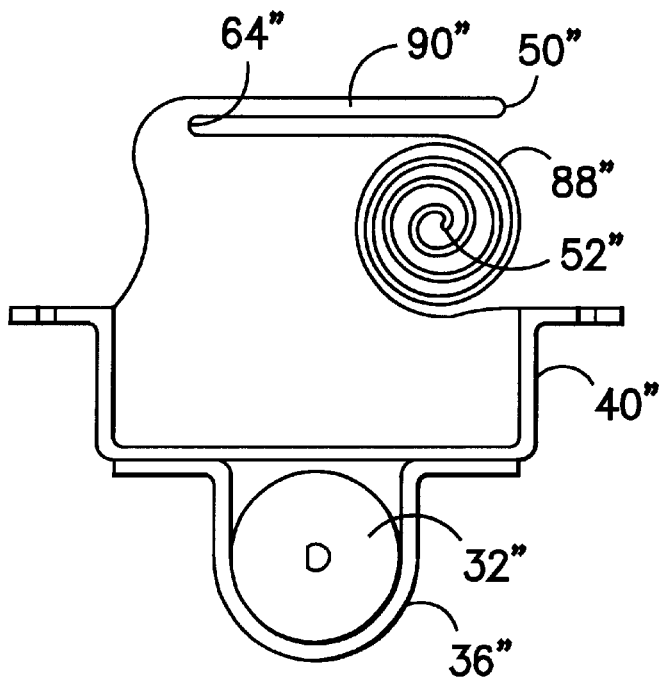
FIG. -11-
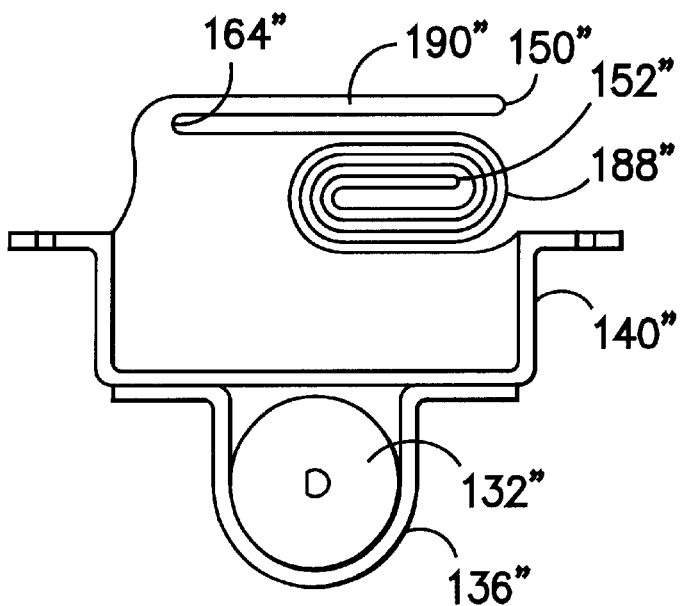
FIG. -11A-

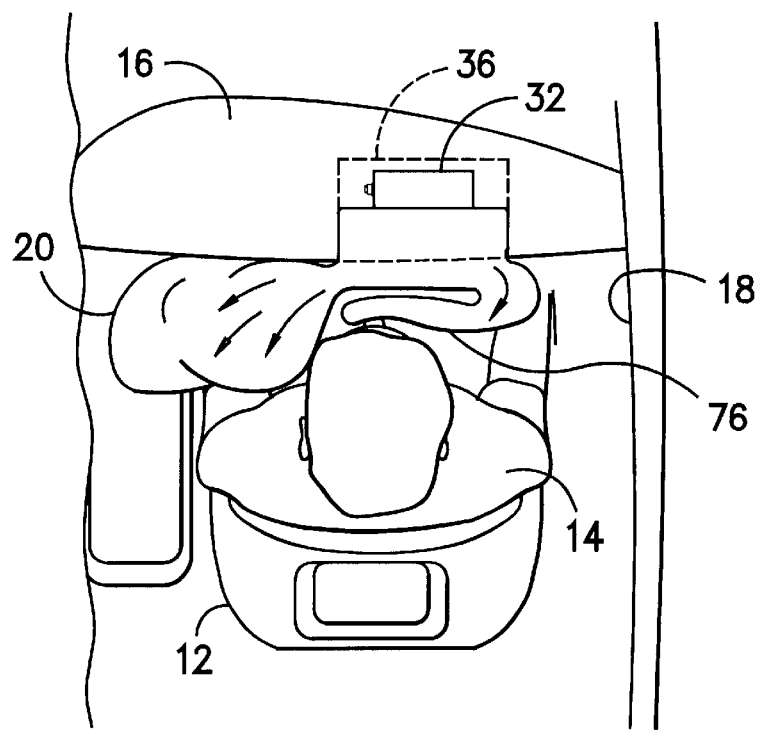
FIG. -12-
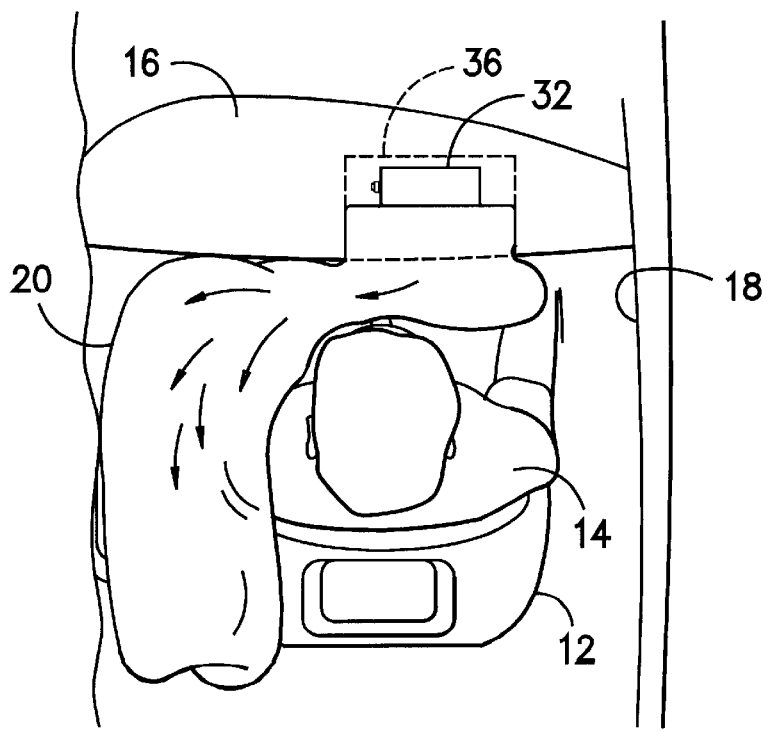
FIG. -12A-

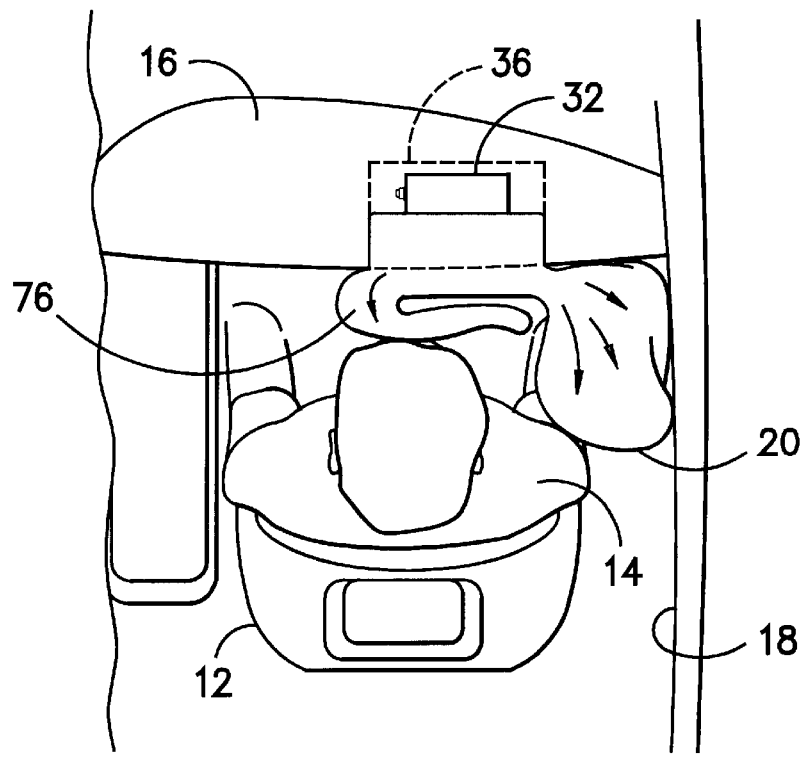
FIG. -13-
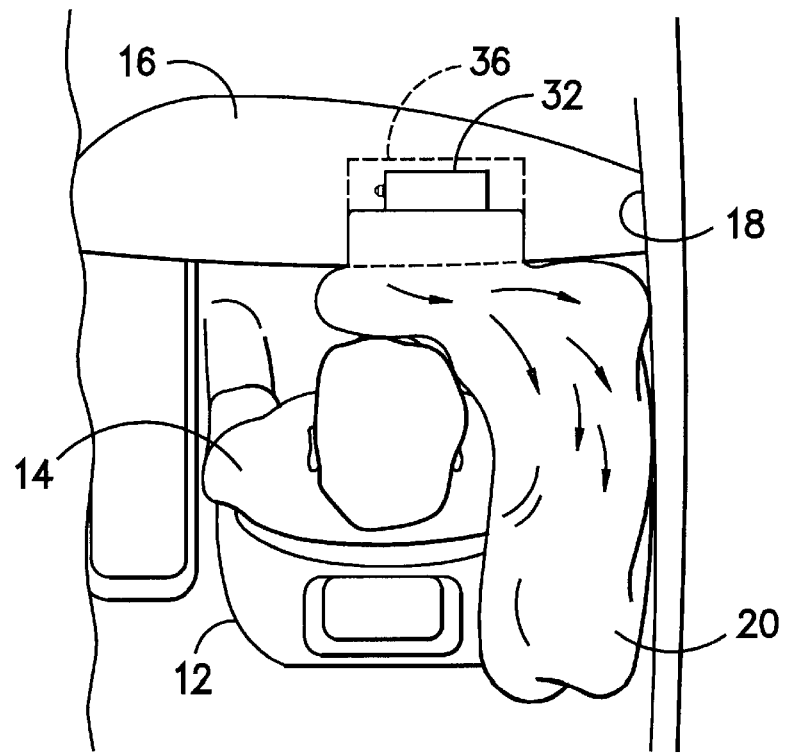
FIG. -13A-

BIAS DEPLOYMENT INFLATABLE AIR BAG

CROSS-REFERENCE TO RELATED APPLICATION

This applications claims benefit from previously filed provisional application No. 60/244,634 bearing a filing date of Oct. 31, 2000 the contents of which are incorporated in their entirety as if fully set forth herein.

TECHNICAL FIELD

This invention relates to a folded air bag cushion for use in a supplemental inflatable restrain system of a vehicle and more particularly to an air bag and method of folding such air bag which permits efficient storage of the air bag and controlled bias deployment of the air bag in a lateral direction upon encountering an outward obstruction.

BACKGROUND OF THE INVENTION

It is well known to utilize inflatable air bag cushions within a transportation vehicle to absorb a portion of the kinetic energy of an occupant during a collision event. Air bag cushions for the protection of a vehicle passenger may be inflated from a storage position substantially opposing the passenger such as from the instrument panel or the like. The air bag cushion is typically stored in a folded condition in fluid communication with a gas emitting inflator within a storage structure commonly referred to as a module. Due to the substantial inflated volume of the air bag cushion, such cushions are typically subjected to multiple folding operations in order to conform the folded air bag structure to the space requirements of the associated module. One such folding procedure is described in U.S. Pat. No. 5,425,551 the contents of which are incorporated by reference as if fully set forth herein.

In general, it is believed that compacting the air bag cushion into a smaller area may be desirable for space allocation purposes. However, the desire for a smaller storage area may not override the need for the air bag cushion to exhibit rapid and controlled deployment upon introduction of the inflation gas. Thus, the general space saving benefits realized by having the footprint of the air bag cushion and related module occupy a relatively small area should not prevent the air bag cushion from expanding quickly and efficiently into its desired operative position in substantially opposing relation to the occupant to be protected as the inflation gas is introduced. Moreover, the folding operation utilized to achieve compaction of the air bag cushion should not be overly complex and should be adaptable to a wide variety of air bag cushion constructions of different sizes and shapes.

The need for a highly versatile folding technique is particularly acute in the packaging of air bag cushions for use in opposing relation to a non-operating passenger such as a side or rear seated passenger within a vehicle. While the operator of the vehicle is generally positioned within a relatively well defined space in front of the operating controls, non-operating passengers may be positioned over a much more expansive region. In order to cover such expansive regions, air bag cushions for the protection of passengers may be of substantial volume and take on much more complex shapes than air bag cushions used for the protection of a vehicle operator.

Due to the fact that some passengers such as persons of small stature may be seated in relatively close proximity to the air bag module, it has also been proposed to direct the inflating air bag cushion in a generally lateral direction relative to the opposing passenger during the early stages of inflation in those instances where the passenger is seated within a predefined short distance away from the module opening. Such lateral deployment may provide a more gentle cushioning interaction between the air bag cushion and the passenger which may be desirable for persons of small stature. One such configuration which utilizes a flap element to selectively close off the top deployment opening to bias and divert the deploying air bag cushion in a lateral direction until the top flap is unfolded is set forth in U.S. Pat. No. 5,348,343 the contents of which are incorporated into this specification by reference as is fully set forth herein.

While the selection of air bag cushion geometry and/or the use of deployment biasing systems are believed to be useful in the achievement of potentially desirable deployment characteristics, the folding techniques used to package the air bag cushion are nonetheless important in the realization of these benefits.

SUMMARY OF THE INVENTION

This invention provides advantages and alternatives over the prior art by providing a packaged air bag cushion and technique for folding the air bag cushion into a compact arrangement in a highly efficient manner which promotes controlled rapid straight forward deployment of the air bag cushion if no obstruction is encountered while at the same time biasing the expansion in a generally lateral direction around the side of the occupant if an obstruction is encountered during the early stages of inflated deployment. An easily executed series of folding steps is utilized to achieve a desired predefined folded surface geometry for storage within the available storage facility within the vehicle and to promote the desired deployment characteristics. The folded structure has a concentration of folds along one lateral side to aid in deployment in a lateral direction.

These advantages are accomplished in a potentially preferred form of the invention by providing an air bag cushion folded for storage within a vehicle to achieve a predefined folded surface geometry footprint of a predefined width and height corresponding to a desired storage location for the folded air bag cushion. A portion of the air bag cushion extending along a first lateral boundary edge for deployment inboard or outboard of the passenger seating location is folded in a multi-layer construction inwardly towards a first internal lateral boundary line to establish a first lateral edge of the predefined folded surface geometry footprint. A portion of the air bag cushion disposed along the opposing lateral boundary edge is folded inwardly across the top side of the air bag cushion in a substantially hinging flap-like fashion along a second internal lateral boundary line corresponding to a second lateral edge of the predefined folded surface geometry. The portion of the air bag folded in flap-like fashion establishes a covering flap extending across the top side of the air bag cushion substantially between the first and second internal lateral boundary lines. The application of such lateral folds yields an intermediate folded construction of elongate configuration having a width substantially corresponding to the desired width of the predefined folded surface geometry footprint. The top and bottom ends of the intermediate folded construction are folded or rolled inwardly in a manner such as disclosed in U.S. Pat. No. 5,425,551 until reaching the respective upper and lower boundary lines of the predefined folded surface geometry footprint. The resultant folded air bag configuration having the predefined folded surface geometry footprint may thereafter be packed into an appropriate containment housing in fluid communication with a gas emitting inflator. It is contemplated that such a packaged air bag cushion may be used either alone or in combination with a biasing guide member such as disclosed in U. S. Pat. No. 5,348,343 to promote lateral movement by the air bag cushion in instances where an opposing obstruction is encountered.

In accordance with other potentially preferred aspects of the invention, the air bag cushion is formed of a highly pliable material such as a woven textile fabric either with or without a permeability blocking coating. Such a woven textile fabric is preferably formed of multi-filament yarns having a relatively low denier per filament linear density rating of about 3 to about 8 denier per filament. Low denier per filament ratings may promote the compact packaging of the air bag cushion using the folding techniques according to the present invention.

Advantageously, the packaging techniques and resulting air bag assembly according to the present invention promote potentially desireable inflation characteristics and are highly adaptable to air bag cushions having a wide variety of geometries. Moreover, the individual folding steps avoid undue complexity which may reduce the opportunity for error. The present invention is thus believed to provide new and useful advantages over the state of the art.

BRIEF DESCRIPTION OF THE DRAWINGS

An embodiment of the present invention is described below by way of example only, with reference to the accompanying drawings in which:

FIG. 1 is a cut-away view of a passenger side of a vehicle interior including an air bag module and showing a deployed air bag cushion in phantom lines in relation to an occupant seated at a typical distance away from the module;

FIG. 2 is a cut-away side view of a passenger side air bag module;

FIG. 3 is a plan view of an exemplary air bag cushion in a substantially flat, uninflated condition showing a centerline and boundary lines for a desired predefined folded surface geometry;

FIG. 4 is a view of a pleat arrangement taken generally along line 4—4 in FIG. 3

FIG. 5 is a view similar to FIG. 3 illustrating an intermediate folded configuration for the air bag cushion following the application of lateral folds;

FIG. 6 is a view taken generally along line 6—6 in FIG. 5 illustrating the intermediate folded construction for the air bag cushion in relation to an underlying air bag module wherein the folds along an inboard lateral edge are in the form of a multiple layered serpentine roll;

FIG. 6A is a view similar to FIG. 6, wherein the folds along an inboard lateral edge are in the form of a multiple layered flat fold construction;

FIG. 6B is a view similar to FIG. 6 wherein the folds along an inboard lateral edge are in the form of a multiple layered fan fold construction;

FIG. 7 is a view similar to FIG. 6 but illustrating an additional fold to achieve the desired predefined folded surface geometry footprint;

FIG. 7A is a view similar to FIG. 7 wherein the folds along an inboard lateral edge in the form of a multiple layered flat fold construction;

FIG. 7B is a view similar to FIG. 7 wherein the folds along an inboard lateral edge are in the form of a multiple layered fan fold construction;

FIG. 8 is a view similar to FIG. 6 but illustrating an additional pleat to achieve the desired predefined folded surface geometry footprint;

FIG. 8A is a view similar to FIG. 8 wherein the folds along an inboard lateral edge in the form of a multiple layered flat fold construction;

FIG. 8B is a view similar to FIG. 8 wherein the folds along an inboard lateral edge are in the form of a multiple layered fan fold construction, FIG. 9 is an inboard end view of the air bag module and associated folded air bag cushion following application of end folds in the form of serpentine rolls to the intermediate folded composite in FIG. 5;

FIG. 9A is a view similar to FIG. 9 wherein the end folds are in the form of a multiple layered flat fold construction;

FIG. 9B is a view similar to FIG. 9 wherein the end folds are in the form of a multiple layered fan fold construction;

FIG. 10 is a view similar to FIG. 9 wherein the upper end fold is in the form of a serpentine roll overfold;

FIG. 10A is a view similar to FIG. 9 wherein the upper end fold is in the form of a multiple layered flat overfold construction and the lower end fold is in the form of a multiple layered flat underfold construction;

FIG. 11 is a view similar to FIG. 9, wherein the upper end fold is in the form of a flat flap overfold and the lower end fold is in the form of a multiple layered serpentine underfold;

FIG. 11A is a view similar to FIG. 11, wherein the lower end fold is in the form of a multiple layered flat underfold construction;

FIG. 12 is a top view of a passenger side of a vehicle interior with an occupant in close proximity to the dash panel and with the air bag cushion in an initial stage of deployment to an inboard position relative to the occupant;

FIG. 12A is a view similar to FIG. 12 with the air bag cushion fully deployed to the inboard side of the occupant;

FIG. 13 is a view similar to FIG. 12 but with the air bag cushion in an initial stage of deployment of an outboard position relative to the occupant; and FIG. 13A is a view similar to FIG. 13 with the air bag cushion fully deployed to the outboard side of the occupant.

While the invention has been illustrated and generally described above and will hereinafter be described in connection with certain potentially preferred embodiments, procedure and practices, it is to be understood that in no event is the invention to be limited to such illustrated and described embodiments, procedures or practices. On the contrary, it is intended that the present invention shall extend to any and all alternatives and modifications as may embrace the principles of this invention within the true spirit and scope thereof.

DESCRIPTION OF THE PREFERRED EMBODIMENT

Referring to FIG. 1, it is seen that a vehicle 10 may include a seating structure 12 to support an occupant 14 such as a vehicle passenger in generally opposing relation to an instrument panel 16 and adjacent to an interior side structure 18. An inflatable air bag cushion 20 is housed within the instrument panel 16 for outward deployment towards the occupant 14 in the event of a collision. As illustrated in phantom lines in normal operation upon deployment the air bag cushion 20 provides coverage over an expansive surface between the occupant 14 and the instrument panel 16. Thus, the air bag cushion 20 is typically of a deep geometry of generally arcuate profile having a substantial depth to expand into the region between the occupant 14 and the instrument panel 16 and substantial breadth in the direction generally parallel to the instrument panel 16. As discussed further hereinafter, and as illustrated in FIGS. 12, 12A, 13 and 13A according to the present invention in instances when full outward expansion towards the occupant 14 is obstructed, the air bag cushion 20 is biased in a predetermined lateral direction around the occupant 14 to provide a relatively gentle cradling interaction.

According to the potentially preferred embodiment, the air bag cushion 20 is housed within a module 30 at a position below the surface of the instrument panel 16. As best illustrated in FIG. 2, the module includes a gas emitting inflator 32 which is activated by an initiator 34 such as a pyrotechnic squib or other suitable device as will be well known to those of in the art. The gas emitting inflator 32 is preferably stored within a housing 36 so as to be in fluid communication with the air bag cushion 20. The inflator 32 includes one or more discharge openings 38 for transmission of inflation gas into the air bag cushion 20. As illustrated, the air bag 20 may be stored in folded condition within an air bag containment housing 40 attached to the inflator housing 36 although such an air bag containment housing 40 may also be absent if desired.

Regardless of whether or not an air bag containment housing 40 is utilized to store the air bag cushion 20, the air bag cushion 20 is compacted by folding into a size and shape compatible with storage at a discrete location within the instrument panel 16 in fluid communication with the inflator 32. In FIG. 3, there is illustrated an exemplary air bag cushion 20 in a substantially flat, uninflated state prior to folding. For reference purposes only, an air bag containment housing 40 is illustrated in hidden underlying relation to the air bag cushion 20 prior to folding so as to promote an understanding of the folding steps utilized to achieve a desired predefined folded surface geometry footprint for the air bag cushion 20. As will be appreciated, in the event that the module 30 incorporates an air bag containment housing 40, packaging of the air bag cushion 20 into the air bag containment housing 40 requires compaction into a folded surface geometry which permits insertion of the air bag cushion 20 into the air bag containment housing 40. Even in the event that an air bag housing 40 is not utilized, the air bag 20 must nonetheless fit within the confines of the chamber available for storage within the instrument panel 16.

As best illustrated through simultaneous reference to FIGS. 3–5, in a pre-folded condition, the air bag cushion 20 is preferably of a substantially planar configuration having a top side 22 facing away from underlying containment structures and an underside 24 facing generally away from the top side 22. While the air bag cushion 20 is illustrated as being substantially rectangular in configuration, it is to be appreciated that the air bag cushion 20 may in fact take on any number of different geometries as may be suitable for providing coverage across the region between the occupant 14 and the instrument panel 16. Moreover, while the air bag cushion is illustrated in attached relation to a containment housing 40 during the folding process, such attachment is illustrated to facilitate an understanding of the folding processes and is in no way critical to the practice of the invention. To the contrary, it is contemplated that the air bag cushion may undergo the folding procedure according to the present invention well in advance of attachment to any associated storage elements Regardless of the actual geometry utilized, in a flat condition prior to folding the air bag cushion 20 has a defined geometry including a top boundary edge 50, a bottom boundary edge 52, a first lateral boundary edge 54, and a second lateral boundary edge 56 disposed in generally opposing relation to the first lateral boundary edge 54. As illustrated in FIG. 4, an interior bottom pleat 68 may be introduced along the bottom boundary edge 52 as desired to achieve the desired geometry.

According to one potentially preferred practice of the present invention, during the folding operation a first internal lateral boundary line 60 running generally transverse to the top boundary edge 50 and the bottom boundary edge 52 is defined to substantially correspond with the inboard lateral boundary for the desired final folded surface geometry footprint. A second internal lateral boundary line 62 extending generally transverse to the top boundary edge 50 and to the bottom boundary edge 52 is defined substantially corresponding to the outboard lateral boundary edge of the desired folded surface geometry footprint. An internal upper boundary line 64 disposed at an interior position below the top boundary edge 50 and extending substantially transverse to the first and second internal lateral boundary lines 60, 62 is defined to correspond substantially with the desired upper boundary of the folded surface geometry footprint. An internal lower boundary line 66 disposed along a latitude between the internal upper boundary line 64 and the bottom boundary edge 52 of the air bag cushion 20 such that the distance between the internal upper boundary line 64 and the internal lower boundary line 66 corresponds substantially to the desired height dimension for the desired final folded surface geometry footprint of the air bag cushion 20. The region bounded by the first and second internal lateral boundary lines 60, 62 and the internal upper and lower boundary lines 64, 66 corresponds generally to the desired final folded surface geometry footprint generally overlying a longitudinal geometric reference centerline 58 for the final folded construction geometry.

According to the potentially preferred practice, the first and second lateral boundary edges 54, 56 of the air bag cushion 20 are folded inwardly in the direction of the centerline 58 to obtain an intermediate folded construction as illustrated in FIG. 5. The nature of the folding action along each of the first and second lateral boundary edges 54, 56 is dependent upon the inflation characteristics desired in the event that the air bag cushion encounters an obstruction during the initial stages of inflation. By way of example only, in the event that lateral deployment is desired to the inboard side (i.e. towards the center of the vehicle 10) as shown in FIGS. 12 and 12A, the portion of the air bag cushion 20 between the first lateral boundary edge 54 and the first internal lateral boundary line 60 is folded inwardly in a multi-layered construction generally in the direction of the centerline 58 until the resulting edge of the folded structure corresponds substantially to the position of the previously defined internal lateral boundary line 60.

A first practice for the inward folding of the first lateral boundary edge 54 is illustrated in FIG. 6 wherein the portion of the air bag cushion 20 between the first lateral boundary edge 54 and the first internal lateral boundary line 60 is folded inwardly in a multiple layered folded construction 70 of a generally serpentine roll configuration. By way of example only, a second practice for the inward folding of the first lateral boundary edge is illustrated in FIG. 6A wherein previously identified elements in FIG. 6 are designated by like reference numerals increased by 100. As shown, in this practice the first lateral boundary edge portion is folded inwardly in a multiple layered folded construction 170 formed from a plurality of generally flat folds such as may be applied using folding cards or the like. By way of example only, a third practice for the inward folding of the first lateral boundary edge is illustrated in FIG. 6B wherein previously identified elements in FIG. 6 are designated by like reference numerals increased by 200. As shown, in this practice, the first lateral boundary edge portion is folded inwardly in a multiple layered folded construction 270 in a fan fold construction. In each case, the material to the inboard side of the centerline 58 is concentrated in a zone closer to the centerline 58. Of course, other folding techniques such as accordion folds and the like as will be known to those of skill in the art may also be utilized if desired. Regardless of the type of folds utilized, the folding operation along the inboard lateral boundary of the air bag cushion 20 is intended to provide a concentrated accumulation of material along the inboard edge of the folded construction which thereafter may be readily expanded in an inboard direction as the air bag cushion is inflated.

As will be appreciated, the portion of the air bag cushion 20 between the first lateral boundary edge 54 and the first internal lateral boundary line 60 preferably corresponds to the portion of the air bag cushion 20 which is ultimately deployed generally to the inboard side of the opposing occupant 14. Thus, in the environment of use illustrated in FIGS. 12 and 12A wherein the occupant 14 is seated on the front passenger side of the vehicle 10, the portion of the air bag cushion between the first lateral boundary edge 54 and the first internal lateral boundary line 60 is deployed generally to an inboard position relative to the occupant 14.

As seen in FIG. 6, in addition to the application of the multi-layered folded construction 70 along the first lateral boundary edge 54, according to a potentially preferred practice wherein the air bag cushion 20 is to be biased to an inboard position, the second lateral boundary edge 56 is folded in hinging fashion in the direction of the centerline 58 generally along the second internal lateral boundary line 62 so as to establish a covering flap 76 extending across the top side 22 of the air bag cushion 20 in the region between the first and second internal lateral boundary lines 60, 62. As will be appreciated, upon inflation the portion of the air bag cushion 20 forming the covering flap 76 is deployed generally to an outboard position in front of an opposing vehicle occupant 14. In normal operation as inflation gas is introduced, the air bag cushion 20 seeks to achieve a fully open substantially symmetrical condition with folded portions returning to their relative prefolded orientations causing the air bag cushion 20 to expand substantially straight towards the occupant 14. Thus, the covering flap 76 will tend to hinge away from the top side 22 to promote full outward expansion in substantially direct opposing relation to the occupant 14.

In the event that the occupant 14 is seated at an unusually close position so as to obstruct full hinging rotation by the covering flap 76 (FIG. 12), available inflation gas is preferentially directed into the portion of the air bag cushion 20 between the first lateral boundary edge 54 and the first internal lateral boundary line 60. This preferential inflation causes the air bag cushion 20 to deploy in a lateral inboard direction using available material to move around the inboard side of the occupant 14.

In FIGS. 7, 7A and 7B alternative folded configurations are illustrated which correspond generally to FIGS. 6, 6A and 6B respectively wherein like elements are designated by like reference numerals with a prime and wherein the covering flaps 76', 176', 276' are excessively long As illustrated, in such folded configurations the distal portions 80', 180', 280' of the covering flaps are tucked in a reverse fold back towards the second internal lateral boundary line 62', 162', 262' until the resulting nose portion 82', 182', 282' is brought into the desired position within the inboard boundary of the desired folded footprint. As will be appreciated, in the event that an obstruction is encountered by the covering flaps 76', 176', 276' this folding arrangement gives rise to the same preferential lateral expansion as previously described.

In FIGS. 8, 8A and 8B alternative folded configurations are illustrated which correspond generally to FIGS. 6, 6A and 6B respectively wherein like elements are designated by like reference numerals with a double prime and wherein the covering flaps 76", 176", 276" have been shortened to a desired length by the introduction of a substantially parallel pleat 84", 184", 284". As will be appreciated, in the event that an obstruction is encountered by the covering flaps 76", 176", 276" this folding arrangement gives rise to the same preferential lateral expansion as previously described.

As indicated, it is contemplated that the air bag cushion may also be folded to promote deployment outboard of the occupant 14 (i.e towards the side structure 18) in the manner as illustrated in FIGS. 13 and 13A. In the event that such deployment characteristics are desired, the folding operations as described above in relation to the first and second lateral boundary edges 54, 56 are simply reversed. That is, the second lateral boundary edge 56 is folded inwardly in a multi-layered material concentrating construction while the first lateral boundary edge 54 is folded over top to establish an inflatable flap. As will be appreciated each of the previously illustrated and described multi-layered folds and flap forming configurations are likewise suitable for such an arrangement.

Referring now to FIGS. 5, 9, 9A and 9C, in either an inboard or outboard bias arrangement, the portion of the air bag cushion 20 between the top boundary edge 50 and the internal upper boundary line 64 is preferably folded inwardly in the direction of the internal upper boundary line, in a compact arrangement such as a serpentine roll 86 (FIG. 9), a multiple layered flat fold arrangement 186 (FIG. 9A), a multiple layered fan fold arrangement 286 (FIG. 9B) or such other arrangement as may be desired. As will be appreciated, this folded portion of the air bag cushion 20 between the top boundary edge 50 and the internal upper boundary line 64 corresponds generally to the upper deployed portion of the air bag cushion 20 in the inflated condition. The desired predefined folded surface geometry is completed by folding the portion of the air bag cushion 20 between the bottom boundary edge 52 and the internal lower boundary line 66 (either with or without an internal pleat 68 along the bottom boundary edge) inwardly in the direction of the internal lower boundary line 66 in a multiple layered compact arrangement such as a serpentine roll 88 (FIG. 9), a multiple layered flat fold arrangement 188 (FIG. 9A), a multiple layered fan fold arrangement 288 (FIG. 9B) or such other multi-layered arrangement as may be desired.

It is contemplated that fold arrangements adjacent the top boundary edge 50 and the bottom boundary edge 52 may be subject to a wide range of alternatives. In particular, due to the relatively small amount of material between the top boundary edge 50 and the internal upper boundary line 64 it is contemplated that any number of folding arrangements may be used without causing undue disruption to the final packed geometry. By way of example only and not limitation, in FIGS. 10 and 10A there are illustrated alternative folding arrangements corresponding to those illustrated in FIGS. 9 and 9A respectively but where the portion of the air bag cushion between the top boundary edge and the internal upper boundary line is folded inwardly in a multiple layered overfold construction in the direction of the internal upper boundary line in a multiple layered compact arrangement such as a serpentine roll 86' (FIG. 10), a multiple layered flat fold arrangement 186' (FIG. 10A) or such other folding arrangement as may be desired. In FIGS. 11 and 11A there are illustrated still further alternative folding arrangements similar to those of FIGS. 10 and 10A but wherein the portion of the air bag cushion between the top boundary edge 50", 150" and the internal upper boundary line 64", 164" is folded inwardly in the form of an overfold flap 90", 190" in the manner shown.

As will be appreciated, the final resulting folded configuration is preferably characterized by a surface geometry footprint generally corresponding to the region enclosed by the internal upper boundary line 64, the internal lower boundary line 66, and the first and second internal lateral boundary lines 60, 62. The final resulting folded configuration has a substantially preferential accumulation of material disposed to one side of the centerline 58 after folding has occurred. It is believed that this preferential accumulation of material to one side of the centerline 58 facilitates the ability of the air bag cushion to undergo preferential lateral movement in that direction upon inflation. By way of example only and not limitation, it is contemplated that in the potentially preferred folding practice not less than about 10 percent and more preferably about 15 to 30 percent or more of the total mass of the air bag cushion is shifted from an initial position on one side of the centerline 58 to a final position on the other side of the centerline 58. As will be appreciated, some air bag cushions will have a substantially symmetrical distribution of mass around the centerline 58 prior to folding while others have an asymmetrical mass distribution. In ether event, according to the potentially preferred practice it is contemplated that not less than about 60 percent, and more preferably about 60 percent to about 90 percent of the total mass of the air bag cushion is disposed to the bias deployment side of the centerline 58 in the final folded configuration after any mass shift has taken place.

Despite this preferential concentration of material to the deployment side of the centerline 58, it has been found that the air bag cushion 20 folded according to the arrangements of the present invention may be deployed rapidly over a broad surface area in front of an occupant 14 to be protected under normal conditions while nonetheless being preferentially directed in a predetermined lateral direction for deployment around the side of the occupant 14 in instances when the position of the occupant 14 or other element within the natural deployment path obstructs direct outward deployment. In this regard, it is contemplated that this folding arrangement may be particularly useful in combination with a cooperating non-inflating biasing flap arrangement such as shown and described in U.S. Pat. No. 5,348, 343. Of course, the folding practices and resultant air bag packaging configurations may likewise to utilized without a non-inflating biasing flap arrangement if desired.

In order to carry out the folding processes of the present invention it is contemplated that the air bag cushion is preferably formed of a relatively thin and substantially pliable material. Textile structures such as woven, knitted or nonwoven fabrics of polyester or nylon may be particularly useful. By way of example only and not limitation, one material which may be desirable is a woven fabric of multi-filament nylon yarn. Such nylon yarn preferably has a yarn linear density of about 210 to about 840 denier and a relatively low denier per filament rating of about 3 to about 8 denier per filament and more preferably about 3 to about 6 denier per filament. Such fabric may be either coated with a permeability reducing coating or may be uncoated. In the event that a coating is utilized, such coating is preferably present at a relatively low add-on weight in the range of about 0.1 to about 1.0 ounces per square yard (most preferably about 0.5 ounces per square yard or less) to facilitate the folding procedure and will preferably reduce the permeability across the fabric to levels of not greater than about 1 cubic foot of air per minute per square foot of fabric when a differential pressure of one half inch of water is applied across the fabric. By way of example only, and not limitation, such coatings may include dispersions of polyurethanes, polyamides, acrylics and combinations thereof It is to be understood that while the present invention has been illustrated and described in relation to potentially preferred embodiments, constructions and procedures, such embodiments, constructions and procedures are illustrative only and that the present invention is in no event to be limited thereto. Rather, it is contemplated that modifications and variation embodying the principles of the present invention will no doubt occur to those of skill in the art. It is therefore contemplated and intended that the invention shall extend to all such modifications and variation as may incorporate the broad aspects of this invention within the full spirit and scope thereof.

What is claimed is:

1. An air bag restraint for protection of an occupant within a transportation vehicle comprising: an inflatable cushion in fluid communication with a gas expelling inflator, the cushion being folded to assume a compact folded arrangement for storage at a defined storage location within the vehicle in substantially opposing relation to the occupant, the compact folded arrangement including an inboard lateral boundary for disposition within the vehicle facing generally towards the center of the vehicle and a generally opposing outboard lateral boundary for disposition within the vehicle facing away from the center of the vehicle, the compact folded arrangement further including a series of mass concentrating folds extending generally along one of the lateral boundaries, said cushion having variable deployment characteristics such that said cushion is normally deployable outwardly away from said storage location and generally towards the occupant upon introduction of gas from the inflator and such that upon encountering an obstruction at the initiation of deployment, the direction of deployment is biased laterally of and to the side of the occupant in the direction faced by the lateral boundary along which the mass concentrating folds extend.

2. The invention as recited in claim 1, wherein within the compact folded arrangement not less than about 60 percent of the mass of said cushion is disposed on one side of a geometric longitudinal centerline running through the compact folded arrangement and wherein the mass concentrating folds are disposed on that one side.

3. The invention as recited in claim 2, wherein about 60 percent to about 90 percent of the total mass of said cushion is disposed on said one side of the geometric longitudinal centerline running through the compact folded arrangement and wherein the mass percentage of said cushion disposed on said one side of the geometric centerline running through the compact folded arrangement is at least 15 percentage points higher than the mass percentage of said cushion on a corresponding side of a corresponding longitudinal centerline position within said cushion prior to folding.

4. The invention as recited in claim 1, wherein the mass concentrating folds extend generally along the inboard lateral boundary.

5. The invention as recited in claim 4, wherein the mass concentrating folds are selected from the group consisting of; a serpentine roll construction, an arrangement of flat folds, and a fan fold construction.

6. The invention as recited in claim 1, wherein the mass concentrating folds extend generally along the outboard lateral boundary.

7. The invention as recited in claim 6, wherein the mass concentrating folds are selected from the group consisting of; a serpentine roll construction, an arrangement of flat folds, and a fan fold construction.

8. The invention as recited in claim 1, wherein said cushion comprises a textile fabric of pliable character.

9. The invention as recited in claim 8, wherein said textile fabric is woven from a plurality of multi-filament yarns wherein said multi-filament yarns have a yarn linear density of about 210 denier to about 840 denier with a filament linear density of about 3 to about 6 denier per filament.

10. An air bag restraint for protection of an occupant within a transportation vehicle comprising: an inflatable cushion in fluid communication with a gas expelling inflator, the cushion being folded to assume a compact folded arrangement for storage at a defined storage location within the vehicle in substantially opposing relation to the occupant, the compact folded arrangement having an inboard lateral boundary for disposition within the vehicle facing generally towards the center of the vehicle and a generally opposing outboard lateral boundary for disposition within the vehicle facing generally away from the center of the vehicle, the compact folded arrangement further including a series of mass concentrating folds extending generally along one of the lateral boundaries, and an overlying inflatable flap portion attached in hinging relation generally along the other of the lateral boundaries, said cushion being normally deployable outwardly away from said storage location in substantially direct opposing relation to the occupant upon introduction of gas from the inflator by expanded rotation of the inflatable flap in conjunction with expanded inflation of the mass concentrating folds and wherein upon encountering an obstruction at the initiation of deployment, the direction of deployment is biased laterally of and around the side of the occupant in the direction faced by the lateral boundary along which the mass concentrating folds extend.

11. The invention as recited in claim 10, wherein within the compact folded arrangement not less than about 60 percent of the mass of said cushion is disposed on one side of a geometric longitudinal centerline running through the compact folded arrangement and wherein the mass concentrating folds are disposed on that one side.

12. The invention as recited in claim 11, wherein about 65 percent to about 90 percent of the total mass of said cushion is disposed on said one side of the geometric longitudinal centerline running through the compact folded arrangement and wherein the mass percentage of said cushion disposed on said one side of the geometric centerline running through the compact folded arrangement is at least 15 percentage points higher than the mass percentage of said cushion on a corresponding side of a corresponding longitudinal centerline position within said cushion prior to folding.

13. The invention as recited in claim 12, wherein said cushion comprises a textile fabric of pliable character.

14. The invention as recited in claim 13, wherein said textile fabric is woven from a plurality of multi-filament yarns wherein said multi-filament yarns have a yarn linear density of about 210 denier to about 840 denier with a filament linear density of about 3 to about 6 denier per filament.

15. An air bag restraint for protection of an occupant within a transportation vehicle comprising: an inflatable cushion in fluid communication with a gas expelling inflator, the cushion comprising pliable textile fabric having of woven construction formed from a plurality of multi-filament yarns wherein said multi-filament yarns have a yarn linear density of about 210 denier to about 840 denier with a filament linear density of about 3 to about 8 denier per filament, the cushion being folded from an initial unfolded condition to assume a compact folded arrangement for storage at a defined storage location within the vehicle in substantially opposing relation to the occupant, the compact folded arrangement having an inboard lateral boundary for disposition within the vehicle facing generally towards the center of the vehicle and a generally opposing outboard lateral boundary for disposition within the vehicle facing generally away from the center of the vehicle, wherein in the compact folded arrangement about 65 percent to about 90 percent of the total mass of said cushion is disposed on one side of a longitudinal centerline running through the compact folded arrangement and wherein the mass percentage of said cushion disposed on said one side of the longitudinal centerline running through the compact folded arrangement is at least 15 percentage points higher than the mass percentage of said cushion on a corresponding side of a corresponding longitudinal centerline position within said cushion in the initial unfolded condition, the cushion being normally deployable outwardly away from said storage location and in substantially direct opposing relation to the occupant upon introduction of gas from the inflator and such that upon encountering an obstruction at the initiation of deployment, the direction of deployment is biased laterally of and around the side of the occupant.

16. The invention as recited in claim 15, wherein the mass percentage of said cushion disposed on said one side of the longitudinal centerline running through the compact folded arrangement is in the range of about 15 percent to about 30 percent greater than the mass percentage of said cushion on said corresponding side of said corresponding longitudinal position within said cushion in the initial unfolded condition.

17. A method for packaging an inflatable air bag cushion in a compact folded arrangement of predefined geometry for storage within a vehicle wherein the air bag cushion in an initial unfolded condition includes a top side for contacting a vehicle occupant, an underside facing away from the top side, an inboard lateral boundary edge, an outboard lateral boundary edge, a top boundary edge and a bottom boundary edge, the air bag cushion being arranged within the vehicle such that upon inflation of the air bag cushion, a portion of the air bag cushion corresponding to the inboard lateral boundary edge is deployed in an inboard direction generally towards the center of the vehicle and around the side of an occupant to be protected, the method comprising the steps of:

folding the inboard lateral boundary edge inwardly in a multiple layered compact arrangement in the direction of a longitudinal centerline for said compact folded arrangement;

folding the outboard lateral boundary edge in a substantially flap-like fashion inwardly along an internal hinge line and in the direction of said longitudinal centerline so as to establish a covering flap extending across the top side of the air bag cushion a distance substantially corresponding to the desired width dimension of said compact folded arrangement; and folding the top boundary edge and the bottom boundary edge inwardly to yield said predefined geometry.

18. The invention according to claim 17, comprising the further step of packing the folded air bag cushion into a containment housing.

19. The method according to claim 17, wherein the inflatable air bag cushion comprises a textile fabric of pliable character woven from a plurality of multi-filament yarns wherein said multi-filament yarns have a yarn linear density of about 210 denier to about 840 denier with a filament linear density of about 3 to about 6 denier per filament.

20. A method for packaging an inflatable air bag cushion in a compact folded arrangement of predefined geometry for storage within a vehicle wherein the air bag cushion in an initial unfolded condition includes a top side for contacting a vehicle occupant, an underside facing away from the top side, an inboard lateral boundary edge, an outboard lateral boundary edge, a top boundary edge and a bottom boundary edge, the air bag cushion being arranged within the vehicle such that upon inflation of the air bag cushion, a portion of the air bag cushion corresponding to the outboard lateral boundary edge is deployed in an outboard direction generally away from the center of the vehicle and around the side of an occupant to be protected, the method comprising the steps of:

folding the outboard lateral boundary edge inwardly in a multiple layered compact arrangement in the direction of a longitudinal centerline for said compact folded arrangement;

folding the inboard lateral boundary edge in a substantially flap-like fashion inwardly along an internal hinge line and in the direction of said longitudinal centerline so as to establish a covering flap extending across the top side of the air bag cushion a distance substantially corresponding to the desired width dimension of said compact folded arrangement; and folding the top boundary edge and the bottom boundary edge inwardly to yield said predefined geometry.

21. The invention according to claim 20, comprising the further step of packing the folded air bag cushion into a containment housing.

22. The method according to claim 20, wherein the inflatable air bag cushion comprises a textile fabric of pliable character woven from a plurality of multi-filament yarns wherein said multi-filament yarns have a yarn linear density of about 210 denier to about 840 denier with a filament linear density of about 3 to about 6 denier per filament.

* * * * *